United States Patent [19]

Mansukhani

[11] 4,243,694

[45] Jan. 6, 1981

[54] JET INK PROCESS AND INK COMPOSITION FLUORESCENT IN ULTRAVIOLET LIGHT

[75] Inventor: Ishwar R. Mansukhani, Neenah, Wis.

[73] Assignee: Whittaker Corporation, Los Angeles, Calif.

[21] Appl. No.: 919,228

[22] Filed: Jun. 26, 1978

[51] Int. Cl.$^2$ .............................................. B05D 1/04
[52] U.S. Cl. ..................... 427/14.1; 106/21; 106/28; 106/29; 106/30; 427/288
[58] Field of Search ...................... 106/21, 30; 427/16, 427/23, 288, 377, 14.1; 346/75

[56] References Cited

U.S. PATENT DOCUMENTS

| | | | |
|---|---|---|---|
| 2,389,371 | 11/1945 | Kroeger ................................. | 106/30 |
| 2,421,291 | 5/1947 | Schmutzler ............................ | 106/26 |
| 3,465,350 | 9/1969 | Keur et al. ............................. | 346/75 |
| 3,671,451 | 6/1972 | Butterfield ........................ | 252/301.2 |
| 3,705,043 | 12/1972 | Zabiak ................................... | 106/20 |
| 3,715,219 | 2/1973 | Kurz et al. ............................. | 106/22 |
| 4,006,158 | 2/1977 | Fleck et al. ...................... | 260/308 B |

*Primary Examiner*—Carman J. Seccuro
*Attorney, Agent, or Firm*—Henry M. Bissell

[57] ABSTRACT

Ink compositions suitable for ink jet printing on metal, plastic, or paper surfaces, the ink characterized by fluorescent properties in ultraviolet light, incorporating, in solution, a resin component, at least one solvent, proportioned to give the ink properties of heat and steam resistance, said inks are colorless in ordinary light and distinctly fluorescent in ultraviolet light so as to render them particularly suitable as a means for marking various materials whereby marking is normally invisible but easily detectable when subjected to ultraviolet illumination.

According to another of its aspects, this invention is a process for information recording comprising producing a fine jet of liquid, directing a jet of colorless liquid onto a recording medium modulating the density of the applied jet by an electric field in accordance with the information to be recorded, thereby recording said information.

6 Claims, No Drawings

JET INK PROCESS AND INK COMPOSITION FLUORESCENT IN ULTRAVIOLET LIGHT

BACKGROUND OF THE INVENTION

This invention relates to inks characterized by fluorescent properties in ultraviolet light. More specifically, this invention relates to inks which are colorless in ordinary light and distinctively fluorescent in ultraviolet light so as to render them particularly suitable as a means for marking various materials whereby the marking is normally invisible but easily detectable when subjected to ultraviolet illumination for use in a printing apparatus operating on the so-called "ink jet printing" principle. Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflect drops are allowed to impinge to the base medium which is to receive the decorative or informative printed indicia. Apparatus suitable for carrying out the ink jet printing process is described in detail in U.S. Pat. Nos. 3,465,350 and 3,465,351, issued Sept. 2, 1969 and it is in connection with an apparatus and process such as are described in the aforementioned patents that the ink of the present invention is designed to function.

In order to operate satisfactorily in an ink jet printing system, an ink must display a consistent drop breakup length, drop velocity and drop charge under set maching operating conditions.

It has been determined that on ink jet printer, described in U.S. Pat. Nos. 3,465,350 and 3,465,351, inks with viscosity of 25 cps. will perform satisfactorily depending upon the type of nozzle used. However, inks with lower viscosities perform much better. Resistivity of ink may range as high as 10,000 ohm cm. for satisfactory operations.

DESCRIPTION OF THE INVENTION

This invention is a process for information recording comprising producing a fine jet of colored aqueous liquid, directing a jet of colorless liquid onto a recording medium, modulating the density of the applied jet by an electric field in accordance with the information to be recorded, thereby recording said information, applying steam under pressure of from 1 to 15 pounds per square inch from 1 to 95 minutes to said recorded information, thereafter subjecting said recorded information to ultraviolet light, thereby rendering it visible.

Inks of this invention include three basic components. The first is a fluorescent compound for providing visibility of the printed indicia upon excitation with ultraviolet radiation. The second major component is the solvent which provides fluidity to the ink and carries in solution or suspension the resin and colorant. The third component is a resin or binder which remains on the substrate surface after printing and serves to adhere and bind the dye or pigment in position on the substrate surface. In addition to these three components which are found in nearly all fluid printing inks, various other ingredients may be utilized, including drying, dispersing and wetting agents, plasticizers, diluents and the like.

This invention, thus, relates to inks which fluoresce upon excitation with ultraviolet radiation and which emit their light with very short luminescene lifetimes. These inks are organic in nature, also an advantage, in that they do not have the abrasive wearing quality of many inks based on abrasive, inorganic pigments.

Inks whose dyes have luminescence lifetimes which are short enough can be used to trigger switching devices and compounds with lifetimes of greater than 1/900 of a second are operable. Sample fluorescence lifetimes are of the order of $10^{-9}$ to $10^{-12}$ seconds. Fluorescence lifetimes may be as high as hours or more. Inks which fluoresce sufficiently in the 500 to 700 nm. region are desirable for aesthetic as well as practical reasons.

Especially preferred fluorescent dyes include 3-phenyl-7-(1,2-2H-naphthotriazolyl)-coumarin.

The jet printing inks of this invention are free of visible colorants. Inks of this invention contain resin/polymers in concentrations of 1 to 80% alone or in blends, dissolved in solvents. Solvents include aliphatic alcohol and other solvents can be ketones, aldehydes, ethers, esters, glycols, glycol ethers, hydrocarbon, lactones. Typical aliphatic movement alcohols are methyl alcohol, ethyl alcohol, n-propyl alcohol, isopropyl alcohol, n-butyl alcohol, sec-butyl alcohol, tert-butyl alcohol, isobutyl alcohol, n-amyl alcohol, amyl alcohol, isoamyl alcohol, hexyl alcohol, heptyl alcohol, octyl alcohol, or a mixture of same. Aliphatic monovalent alcohols with 1 to 8 carbon atoms are particularly preferred.

Other solvents for these inks are ketones, aldehydes, ethers, esters, hydrocarbons, glycol, glycol ethers and lactones.

Suitable solvents are hydrocarbons, such as hexane, heptane, octane, decane, cyclopentane, cyclohexane, benzene, toluol, xylol, and ethylbenzene; hydrocarbon halides, such as carbon tetrachloride, ethylene dichloride, trichloroethylene, tetrachloroethane, and dichlorobenzene; ether-type solvents, such as butyl ether, ethylene glycol-diethyl ether, ethylene glycol-monoethyl ether, ethylene glycol-monobutyl ether; ketone-type solvents, such as acetone, methylethyl ketone, methyl propyl ketone, methyl isobutyl ketone, methylamyl ketone, cyclohexanone; ester-type solvents, such as ethyl formate, methyl acetate, propyl acetate, butyl acetate, phenyl acetate, ethylene glycol-monoethyl ether acetate, methlypropionate; other alcohol solvents, such as diacetone alcohol or such.

The ink in accordance with the invention also contains at least one resin. The resin component of a jet printing ink suitable for printing on coated or virgin metal must meet a variety of requirements. Of primary importance is the ability of the resin to adhere to the coated or virgin metal surface on which the ink is printed and to maintain this strong adhesion under widely varying conditions of humidity and temperature. When the ink is applied to the metal surface, it must be "wet" or adhere to a coated or virgin metal surface, even in the presence of some moisture, and must exhibit a high degree of moistureproofness, not only to maintain adhesion to the metal but also to protect the dye from the effects of steam which may make the dye bleed into surrounding areas.

The resin component must also be very readily soluble in the solvent combination to form a stable, low viscosity solution that effective amounts can be dissolved in the solvent without unduly increasing the viscosity of the composition.

Synthetic, semi-synthetic and natural resins, which is to say both polymerization as well as polycondensation and polyaddition products, are suitable. In principle, all resins customary in the printing ink and paint industry, such as are, for example, described in the lacquer raw material tables of Karstne (4th edition, Hanover, 1967) and in Wagner and Sarx's work on lacquer resins (4th edition, Munich, 1959) are used.

The following, for example, are suitable resins: colophony and derivatives thereof, hydrogenated colophony, di- or polymerized colophony, as calcium or zinc salt, with colophony esterified with mono- or polyvalent alcohols; with resinifiers such as acrylic acid and butane diol or maleic acid and pentaerythritol modified colophony resin; the soluble phenol resins modified with colophony and resins based on acrylic compounds, maleinate resins, oil-free alkyd resins, styrolated alkyd resins, vinyl toluene modified alkyd resins, alkyd resins with synthetic fatty acids, linseed oil alkyd resins, ricinene alkyd resins, castor oil alkyd resins, soy oil alkyd resins, coconut oil alkyd resins, tall oil and fish oil alkyd resins, acrylated alkyd resins, also oils and oil varnishes. Also suitable are terpene resins, polyvinyl resins such as polyvinyl acetate, polyvinyl chloride, polyvinylidene chloride, polyvinyl acetals, polyvinyl alcohol, polyvinyl ether, copolymers and graft polymers with various vinyl monomers, polyacrylic resins, acrylate resins, polystyrenes, polyisobutylenes, polyesters based on phthalic acid, maleic acid, adipic acid, sebacic acid, etc,; naphthalene formaldehyde resins, furane resins, ketone resins, aldehyde resins, polyurethanes (especially urethane primary-products that cure only at elevated temperature), epoxide resins (especially resin-curer mixtures that cure only at elevated temperature) and precondensates thereof. Suitable too are primary products of unsaturated polyester resins, dialkylphthalate-prepolymers, polyolefines such as polyethylene wax or polypropylene wax, indene and cumaronindene resins, carbamide and sulphonamide resins, polyamide and polyester resins, silicone resins, rubber and derivatives thereof, for example, cyclorubber and chlorinated rubber, chiefly, however, cellulose derivatives such as cellulose esters (nitrocellulose, cellulose acetate and the like), and especially cellulose ethers, for example, methylcellulose, hydroxyethylcellulose, hydroxypropylcellulose, propionitrile cellulose, ethyl cellulose and benzylcellulose. The corresponding derivatives of other polysaccharides can also be used.

While there are disclosed below but a limited number of embodiments of the invention herein presented, it is possible to produce still other embodiments without departing from the inventive concepts herein disclosed. Various other modifications will be readily apparent to those skilled in the art.

| | Parts by Weight |
|---|---|
| Example 1 | |
| polyvinyl butyral resin | |
| (sold as Butvar B-98 by | |
| Monsanto Chemical Corporation, St. Louis, Mo.) | 2.00 |
| methyl cellosolve | 50.00 |
| methanol | 152.40 |
| 3-phenyl-7-(1,2-2H-naphthotriazolyl)-coumarin | 0.10 |
| $MgCl_2$ | 0.60 |
| Example 2 | |
| polyvinyl butyral resin | |
| (sold as Butvar B-98 by | |
| Monsanto Chemical Corporation, St. Louis, Mo.) | 2.00 |
| non-oxidizing polyester exhibiting a viscosity of S-X on the Gardner-Holdt scale and a melting point of 75–85° C. sold as Arochem 650 by Ashland Chemical Company, Columbus Ohio | 10.0 |
| methyl cellosolve | 60.00 |
| methanol | 76.90 |
| $MgCl_2$ | 1.00 |
| Unitex OB brightening agent | 0.10 |
| Example 3 | |
| non-oxidizing polyester exhibiting a viscosity of S-X on the Gardner-Holdt scale and a melting point of 75–85° C. sold as Arochem 650 by Ashland Chemical Company, Columbus, Ohio | 33.00 |
| methyl ethyl ketone | 33.00 |
| methanol | 31.90 |
| Fluorescent dye Aclrate 8678 | 0.51 |
| $MgCl_2$ | 0.10 |
| Example 4 | |
| Pentalyn 255 | 125.00 |
| methanol | 191.00 |
| methyl ethyl ketone | 125.00 |
| methyl cellosolve | 55.00 |
| Fluorescent dye Aclrate 8678 | 1.00 |
| $MgCl_2$ | 1.50 |

The ink was used in the ink jet printing of indicia on the ends of aluminum cans and on tin-free steel cans. The printed indicia dried very quickly to form images displaying excellent adhesion to the substrate, high resistance to abrasion and excellent resistance to steam. The images did not bleed when subjected to steam pasteurization.

Various other examples and modifications of the ink compositions of this invention might be cited or will suggest themselves to those skilled in the art, and it is intended that the scope of the invention be limited only as necessitated by the appended claims.

What is claimed is:

1. A process for information recording comprising producing a fine jet of colorless aqueous liquid containing at least one resin and at least one dye which is invisible in ordinary light, directing the jet of colorless liquid onto a recording medium, modulating the density of the applied jet by an electric field in accordance with the information to be recorded, thereby recording said information, and subsequently applying steam to said recorded information.

2. The process of claim 1 wherein said dye is 3-phenyl-7-(1,2-2H-naphthotriazolyl)-coumarin.

3. A process for information recording comprising producing a fine jet of liquid containing at least one resin and at least one dye which is invisible in ordinary light, directing the jet of colorless liquid onto a recording medium, modulating the density of the applied jet by an electric field in accordance with the information to be recorded, thereby recording said information, applying steam under pressure of from 1 to 15 pounds per square inch from 1 to 95 minutes to said recorded information, thereafter subjecting said recorded information to ultraviolet light, thereby rendering it visible.

4. The process of claim 1 wherein the dye fluoresces between 500 and 700 nm.

5. The process of claim 3 wherein the liquid contains from 1 to 80% of a resin, and a solvent which is an aliphatic monovalent alcohol of from 1 to 8 carbon atoms.

6. The process of claim 5 wherein the colorless liquid contains a dye which fluoresces in the range of from 500 to 700 nm.

* * * * *